(No Model.)
J. H. CAMPBELL.
ENGINE AND METHOD OF OPERATING THE SAME.
No. 337,371. Patented Mar. 9, 1886.
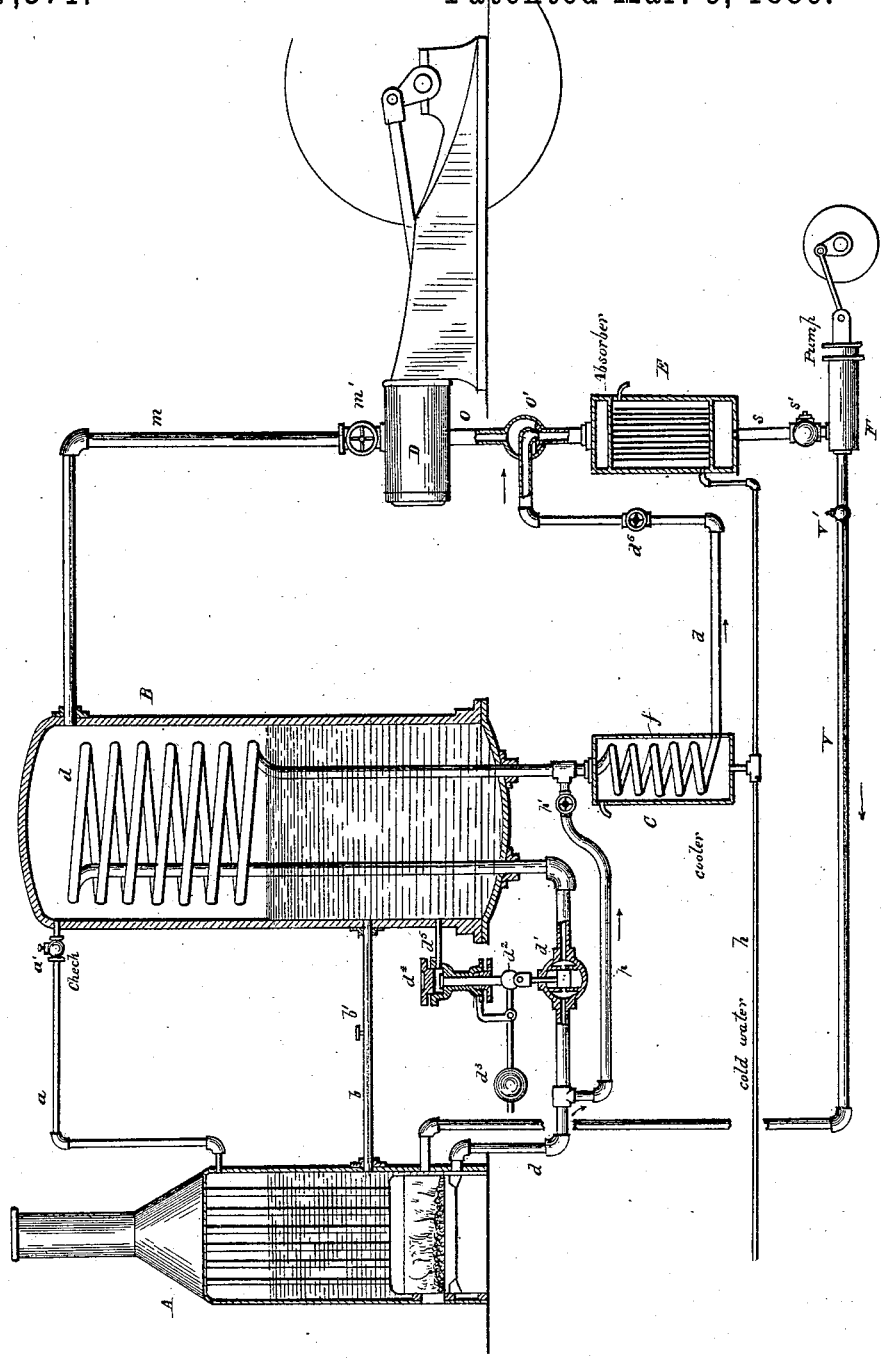
WITNESSES
Edwin L. Yewell,
D. P. Cowl
INVENTOR
Joseph H. Campbell
BY
L. W. Simsabaugh
*Attorney*

UNITED STATES PATENT OFFICE.

JOSEPH H. CAMPBELL, OF NEW YORK, N. Y., ASSIGNOR OF THREE-EIGHTHS TO CHARLES H. CAMPBELL AND JAMES McLAIN, BOTH OF SAME PLACE.

ENGINE AND METHOD OF OPERATING THE SAME.

SPECIFICATION forming part of Letters Patent No. 337,371, dated March 9, 1886.

Application filed June 11, 1885. Serial No. 168,339. (No model.)

*To all whom it may concern:*

Be it known that I, JOSEPH H. CAMPBELL, a citizen of the United States of North America, and a resident of the city, county, and State of New York, have invented a new and useful Improvement in Method of Utilizing Aqua-Ammonia as a Motive-Power in Engines, of which the following is a specification.

My invention relates to improvements in vapor-engines, and particularly to that class in which the fluid used as the elastic medium is composed of a gas and a liquid, the gas being held in solution by physical absorption—for example, a fluid such as aqua-ammonia.

All the advantages of my method and apparatus are available in the use of aqua-ammonia. In this application I will therefore give a full, clear, and exact description of the method and apparatus employed in working this particular fluid. But before proceeding to set forth the several objects of this invention I will state that this invention is based on the well-known physical laws of thermo-dynamics: first, that gas or vapor held in a liquid form by physical absorption may be converted into the gaseous form and state by simply imparting to the fluid its actual or sensible heat—that is, no statical heat is required; second, that in a fluid composed of a liquid and a gas, if the gas is physically absorbed, the density and volume of the gas, or the vapor of such fluids, do not depend directly on the temperature, as the tension of the vapor of liquids does, but depend on the quantity of the fluid and the amount of heat that is imparted to it; third, that in the dynamical use of steam, vapor, or gas generated from a liquid or a fluid a liquid-reservoir to receive the steam, vapor, or gas as rapidly as generated and retain it in the gaseous state available for work is absolutely necessary.

I wish to avail myself of the foregoing properties in this invention.

The object of this invention is to construct and maintain a liquid-reservoir to absorb the ammoniacal vapor generated from the liquid aqua-ammonia, and to retain the same in a gaseous state available for work; second, to so unite this fluid-reservoir with the fluid in the boiler that the tension of the ammoniacal vapor may be regulated by the relative amount of fluid in these two chambers, (the boiler and reservoir;) third, to supply a cooled weak solution of aqua-ammonia to absorb the ammonia-gas that has done work within the cylinder of the engine.

My invention consists, therefore, in charging a boiler with a solution of ammonia and driving the vapor therefrom at a temperature sufficiently high to disengage the vapor from the water into a second chamber or vessel containing the same solution as that in the boiler, and in which the fluid will become supersaturated and the vapor may be superheated and available for use as a motive power.

My invention consists, further, in uniting the liquid in the liquid and vapor reservoir with the liquid in the generator by means of a pipe, so that the tension of the ammoniacal vapor may be regulated by the amount of heat imparted to the fluid, or that the amount of fluid in the generator or reservoir to receive the heat derived from the furnace may be at the will of the operator.

My invention consists, further, in so manipulating the aqua-ammonia that the ammonia is always in the gaseous state, being absorbed by and held in mechanical suspension by the liquid.

My invention consists, further, in drawing off from the generator through a pipe a warm weak solution of aqua-ammonia, cooling the same, and bringing it in contact with vapor that has done work in the cylinder of the engine, the solution being under boiler-pressure and so directed as to produce an induced current toward the absorption-chamber, and by this force mechanically mix the gas and liquid.

My invention consists, further, in certain details of construction and method of operation, which will be fully described hereinafter, and pointed out in the claims.

In the drawings I have shown a side elevation, partly in section, of the devices which embody my invention.

A indicates the boiler in which the vapor is generated, and B an intermediate chamber between the cylinder of the engine and the boiler, the office of which is that of a superheater and a dynamical reservoir, said chamber B being connected to the boiler A by means of a pipe, $b$, entering in each, below the water-line, for the purpose of transferring the fluid or liquid from the boiler to the reservoir, or from the reservoir to the boiler, thereby regulating the pressure, said pipe $b$ being provided with a suitable valve, $b'$, for controlling the flow of the fluid.

$a$ is a pipe which connects the upper portion or dome of the boiler A with the reservoir B at a point above the line of the fluid, said pipe being provided with a check-valve, $a'$, which prevents the flow of the vapor from the reservoir to the boiler, but permits the vapor to pass from the boiler to the reservoir when the pressure in the boiler is in excess of that in the reservoir. The lower portion of the boiler is connected with the lower portion of the reservoir by means of the pipe $d$, which extends up into the vapor-space of the reservoir, and returns by a series of coils to the water-line, and then straight through the liquid and the bottom of the reservoir B.

The object of coiling the pipe $d$ in the vapor-space of the reservoir B is to increase its heating-surface to superheat the vapor, so that the tension of the vapor therein contained can be raised to the proper working pressure without materially changing the temperature of the fluid in the reservoir; and, furthermore, the liquid in its passage through the coil gives off a certain amount of its heat to the liquid and vapor in the reservoir, thereby becoming partially cooled before entering the cooler C. The pipe $d$, after passing through the bottom of the reservoir B, is coiled, as shown at $f$, said coil being inclosed in a chamber, C, which is supplied with cold water by means of the pipe $h$.

The object of cooling the weak solution of aqua-ammonia which passes through this pipe is to increase its absorptive power before it is brought into contact with the exhaust-vapor.

The pipe $d$ is provided with a valve, $d'$, of the well-known type of safety-valves, the head of said valve being provided with an elbow-lever, $d^2$, having a weight, $d^3$, on its horizontal arm, said weight being adapted to be adjusted on said arm so as to hold the valve open and allow of the free passage of the hot liquid from the boiler to the coils of the pipe $d$ in reservoir B. The vertical arm of the lever passes up into a stuffing-box, $a^4$, which is connected with the reservoir B by a pipe, $d^5$, so that when the pressure in the reservoir rises above the desired point it causes the valve $d'$ to close and shuts off the flow of the hot liquid from the boiler A to the reservoir B through that portion of the pipe $d$ until the vapor-pressure in the latter is reduced to the proper working-point.

$m$ is a pipe provided with a throttle-valve, which connects the reservoir B with the cylinder D, through which pipe the proper amount of vapor is admitted to work the piston of the cylinder.

$o$ is a pipe which conducts the exhaust-vapor from the cylinder to the absorbing-chamber E, said chamber being supplied with cold water through the pipe $h$ from any suitable source.

The pipe $d$, after leaving the cooler C, extends upward and enters the enlarged portion $o'$ of the pipe $o$, this end of the pipe being turned down and terminating in a nozzle in the axis of pipe $o'$, and fills the office of a steam-jet to form an induced current in the direction of the absorber, thus mechanically mixing the liquid with the vapor and forming a partial vacuum on the piston and corresponding pressure in the absorber, and by said pressure increasing the absorptive power of the solution.

In order to maintain under boiler-pressure a constant supply of the weak solution sufficient to absorb the exhaust-vapor from the engine, a pipe, $p$, is connected to that part of the pipe $d$ which is between the safety-valve and the boiler, so that when the valve $d'$ closes and cuts off the supply of hot liquid through the pipe and coil within the reservoir the valve $p'$ may be opened and the liquid allowed to flow uninterruptedly from the boiler through the coil $f$ in the cooler C by way of the pipe $p$.

As before intimated, the fluid from the pipe $d$ and exhaust-vapor from the cylinder are brought together in the chamber $o'$, at which point the fluid absorbs the vapor without depriving it of its latent heat, and holds the same in a state of solution until the fluid is pumped back into the boiler A, where the vapor is again disengaged or driven off by the application of a small amount of heat. After the union of the exhaust-vapor with the fluid in the absorber E, it is drawn off through the pipe $s$ to a pump, F, by which means the fluid is returned to the boiler through the pipe $r$, said pipe being provided with a check-valve, $r'$, the pipe $s$ being also provided with a check-valve, $s'$, to regulate the flow of fluid from the absorber to the pump.

The operation of my device is as follows: The boiler A and reservoir B are partially filled with the aqua-ammonia, as above set forth, and heat is applied to the boiler A. The vapor of ammonia generated in the boiler A by the heat is expelled therefrom through the pipe $a$ to the reservoir B, where a great portion of it will be absorbed by the liquid contained therein, on account of the increased pressure in the reservoir and the low temperature of the liquid, and a heat corresponding with such absorption will be produced, tending to superheat the vapor in this part of the reservoir, which will be further increased by the actual heat of the expelled vapor. When this does not produce the desired pressure, the valve $d'$ will automatically open and permit a quantity of the fluid to pass to the coil sufficient to give the desired pressure. When a pressure of from five to six atmospheres is obtained in the above manner, if that is the desired working pressure, the throttle-valve in pipe $m$ is opened, which admits the vapor to the cylinder to operate the piston. The vapor, after performing its office in the cylinder, is exhausted through the pipe $o$ into the chamber $o'$ and E, where it is mingled with and absorbed by the partially-cooled liquid from the boiler, and after passing through the absorber E is pumped back into the boiler. Whether the boiler-pressure be exerted throughout the length of the pipe $d$ or through the pipe $p$ and portions of the pipe $d$, the liquid is injected with great velocity and force, and in the same measure or degree assists the exhaust from the engine.

I do not wish to be understood as limiting myself to the use of aqua-ammonia as a motive power in my process and apparatus for driving engines, but include all fluids or combinations of fluids wherein a gas is physically absorbed by a liquid.

Having thus given an exact description of my method and apparatus, I deem it essential, in order that those who are instructed in the art to which my invention is most nearly allied may fully comprehend the method or construct engines of other styles in conformity with this invention, that certain properties of water, ammonia, and aqua-ammonia should be understood, especially the property of absorption.

Aqua-ammonia is a liquid and a gas or a fluid, the gas being physically and not chemically absorbed by the water. The tension, density, and volume of its vapor do not (as the tension of the vapor of all liquids) depend directly on the temperature, but depend on the quantity of the fluid and the amount of heat imparted to it. Therefore it makes it possible, and this applicant believes imperative, to regulate its tension by the relative quantity of fluid in the boiler and reservoir. Second, it is unlike water in this respect: that with water the higher the temperature the more vapor will be formed and remain in the water, while with aqua-ammonia the lower the temperature of the water the more ammonia-vapor the water will absorb. For example, at a temperature of 32° Fahrenheit five hundred and fifty pounds of water will absorb less than fifteen pounds of its own vapor; at a temperature of 212° five hundred and fifty pounds of water will absorb more than one hundred pounds of steam, while at a temperature of 302° water will absorb one-fourth its weight of steam.

In a steam-boiler half-full of water, if the temperature is 230°, the number of pounds of steam held in the water by absorption will be more than two hundred times greater than in the upper half of the boiler. This property of water to absorb so great an amount of its own vapor is of first importance in its use as a motive power, and since its absorptive power increases as the temperature increases, the boiler is itself at once a generator and dynamical reservoir. A steam-boiler having its cubical contents one hundred times greater than the cylinder and full of steam at sixty pounds pressure could not supply the cylinder for two minutes if the engine were making one hundred revolutions per minute; but on account of this property the same boiler, if charged in the usual manner, if all external heat were withdrawn, would supply the engine for more than twenty minutes. Therefore, the steam-engineer has always, on account of this wonderful physical property of water, an immense reservoir of generated steam, which enables him not only to drive his engine, but (independent of him and without even his knowledge) regulates the power.

The conditions and different circumstances under which water will absorb its own vapor and the vapor of ammonia, and the amount of each it will absorb at different temperatures, will be apparent by reference to the following table.

Column A represents the number of pounds of water vapor or steam one hundred pounds of water will absorb at the temperature indicated; column B the number of pounds of ammonia-vapor one hundred pounds of water will absorb at the indicated temperature, the pressure in neither case being above the atmosphere.

| Fahrenheit. | A | | B |
|---|---|---|---|
| 32° | 2.86 pounds | | 87.5 |
| 45° | 4.09 | " | 71.3 |
| 60° | 5.30 | " | 58. |
| 75° | 6.60 | " | 47.4 |
| 90° | 8.00 | " | 38.1 |
| 105° | 9.17 | " | 31.3 |
| 120° | 10.43 | " | 23.4 |
| 135° | 11.81 | " | 18.5 |
| 150° | 12.94 | " | 14. |
| 165° | 14.28 | " | 8.2 |
| 180° | 15.43 | " | 3.1 |
| 195° | 16.66 | " | 0.5 |
| 200° | 17.23 | " | .00 |
| 212° | 18.00 | " | .00 |

It will be observed from the foregoing table that at 190° Fahrenheit water will not absorb ammoniacal vapor. Practically, at 160° this property is destroyed. Therefore the fluid in the boiler, as soon as this temperature is reached, ceases to be a reservoir for ammoniacal vapor. But it is as important with an ammonia or vapor engine to have a large supply of generated vapor stored as it is with the steam-engine to have a large amount of steam, and indeed more so, for the specific volume of ammoniacal vapor is at all working temperatures more than three times that of the specific volume of steam. Therefore a liquid dynamical reservoir the temperature of which will be independent of or lower than that of the boiler must be constructed and maintained. The temperature of the reservoir should never be in excess of 250° Fahrenheit, preferably not above 230°, while that of the boiler may be from 250° Fahrenheit to 300° Fahrenheit.

For the purpose of increasing the tension it is not necessary to raise the temperature of either the boiler or the reservoir. If the tension or pressure is too high, a part of the liquid in the boiler should be transferred to the reservoir; if too low, a part of the liquid in the reservoir should be transferred to the boiler.

Having thus described my invention, what I claim as new, and desire to secure by Letters Patent, is—

1. The method herein described of utilizing in a vapor-engine a fluid the absorptive power of which decreases as the temperature increases, the same consisting in storing the vapor as it is generated therefrom in a liquid reservoir the temperature of which is lower than the temperature of the boiler.

2. In a vapor-engine, the method herein described of utilizing the vapor of aqua-ammonia, the same consisting in vaporizing the liquid at a comparatively high temperature, conveying the vapor into a storage-chamber containing the same fluid as contained in the boiler at a lower temperature, and in which the vapor is superheated, and then conveying said superheated vapor to the cylinder of the engine where it is used, and the exhaust-vapor returning to the boiler by being absorbed in a current of the liquid at a lower temperature under pressure from the boiler.

3. In a vapor-engine, the method herein described of regulating the pressure in the generator and reservoir, the same consisting in transferring the fluid from the boiler to the reservoir or from the reservoir to the boiler, as occasion may require.

4. In a vapor-engine, the method herein described of preparing and applying the liquid used for absorbing the exhaust-vapor from the engine, the same consisting in heating the liquid, thereby reducing its absorptive power without breaking its continuity, and having it at all times under the pressure of the vapor in the boiler, then cooling the same, thereby restoring its absorptive power, and bringing it under boiler-pressure in contact with the vapor exhausted from the cylinder, so as to produce an induced current in the direction of the absorber.

5. In a vapor-engine, the method herein described of recovering and using the exhaust-vapor from the engine, the same consisting in spraying under boiler-pressure an induced current in the direction of the absorber, a stream of the cold solution from which the vapor is generated into a chamber receiving the exhaust-vapor from the engine, whereby the vapor is absorbed by the solution without surrendering its latent heat, and is mechanically mixed by the force of the spray.

In testimony that I claim the foregoing as my invention I have signed my name, in presence of two witnesses, this 9th day of June, 1885.

JOSEPH H. CAMPBELL.

Witnesses:
WM. E. STILLINGS,
JACOB J. STORER.